United States Patent
Canini et al.

(10) Patent No.: US 9,268,982 B2
(45) Date of Patent: Feb. 23, 2016

(54) DEVICE AND METHOD FOR THE ACQUISITION AND AUTOMATIC PROCESSING OF DATA OBTAINED FROM OPTICAL CODES

(71) Applicant: DATALOGIC IP TECH S.R.L., Lippo di Calderara di Reno (IT)

(72) Inventors: Federico Canini, Zola Predosa (IT); Marco Piva, Pennabilli (IT); Rinaldo Zocca, Bologna (IT)

(73) Assignee: DATALOGIC IP TECH S.R.L., Lippo di Calderera di Reno (IT)

( * ) Notice: Subject to any disclaimer, the term of this patent is extended or adjusted under 35 U.S.C. 154(b) by 0 days.

(21) Appl. No.: 14/543,099

(22) Filed: Nov. 17, 2014

(65) Prior Publication Data

US 2015/0069127 A1  Mar. 12, 2015

Related U.S. Application Data

(63) Continuation of application No. 13/753,912, filed on Jan. 30, 2013, now abandoned, which is a continuation of application No. 13/295,493, filed on Nov. 14, 2011, now Pat. No. 8,368,000, which is a continuation of (Continued)

(30) Foreign Application Priority Data

Nov. 2, 1998 (EP) ..................... 98830665

(51) Int. Cl.
*H01L 27/00* (2006.01)
*G06K 7/10* (2006.01)
(Continued)

(52) U.S. Cl.
CPC ........ *G06K 7/10722* (2013.01); *G06K 7/10841* (2013.01); *G06K 7/10851* (2013.01); *G06K 9/2054* (2013.01); *H04N 5/335* (2013.01)

(58) Field of Classification Search
CPC .... H04N 5/3355; H04N 5/3745; H04N 5/378
USPC .......... 250/208.1, 214 R, 214 DC; 348/222.1, 348/231.3, 294, 302, 308
See application file for complete search history.

(56) References Cited

U.S. PATENT DOCUMENTS 4,882,764 A  11/1989 Reynolds et al.
5,262,871 A  11/1993 Wilder et al.
(Continued)

FOREIGN PATENT DOCUMENTS

EP  0484132 A2  5/1992
EP  0 521 484 A1  1/1993
(Continued)

OTHER PUBLICATIONS

English Translation of Notice of Reasons for Rejection in corresponding Japanese Application No. 2009-119651 dated Nov. 16, 2010.

(Continued)

*Primary Examiner* — Kevin Pyo
(74) *Attorney, Agent, or Firm* — Duane Morris LLP

(57) ABSTRACT

The device for the acquisition and automatic processing of data obtained from optical codes comprises a CMOS optical sensor; an analog processing unit connected to the optical sensor; an analog/digital conversion unit connected to the analog processing unit; a logic control unit connected to the CMOS optical sensor, the analog processing unit and the analog/digital conversion unit; and a data-processing unit connected to the logic control unit and the analog/digital conversion unit. The CMOS optical sensor and at least one of the analog processing, analog/digital conversion, logic control and data processing units are integrated in a single chip. The data processing unit processes the digital signals corresponding to the image acquired by the CMOS sensor and extracts the optically coded data.

14 Claims, 9 Drawing Sheets

Related U.S. Application Data application No. 12/341,460, filed on Dec. 22, 2008, now Pat. No. 8,058,600, which is a continuation of application No. 10/247,681, filed on Sep. 20, 2002, now Pat. No. 7,468,499, which is a continuation of application No. 09/432,105, filed on Nov. 2, 1999, now Pat. No. 6,512,218.

(51) Int. Cl.
*G06K 9/20* (2006.01)
*H04N 5/335* (2011.01)

(56) References Cited

U.S. PATENT DOCUMENTS

| | | | |
|---|---|---|---|
| 5,343,028 A | 8/1994 | Figarella et al. | |
| 5,446,272 A | 8/1995 | Barkan | |
| 5,452,004 A | 9/1995 | Roberts | |
| 5,463,214 A | 10/1995 | Longacre, Jr. | |
| 5,521,366 A | 5/1996 | Wang et al. | |
| 5,600,121 A | 2/1997 | Kahn et al. | |
| 5,664,119 A | 9/1997 | Jeffries et al. | |
| 5,702,059 A | 12/1997 | Chu et al. | |
| 5,703,349 A | 12/1997 | Meyerson et al. | |
| 5,710,417 A | 1/1998 | Joseph et al. | |
| 5,723,853 A | 3/1998 | Longacre, Jr. et al. | |
| 5,756,981 A | 5/1998 | Roustaei et al. | |
| 5,773,806 A | 6/1998 | Longacre, Jr. | |
| 5,773,810 A | 6/1998 | Hussey et al. | |
| 5,793,033 A | 8/1998 | Feng et al. | |
| 5,825,006 A | 10/1998 | Longacre, Jr. et al. | |
| 5,900,613 A | 5/1999 | Koziol et al. | |
| 5,949,057 A | 9/1999 | Feng | |
| 5,949,483 A | 9/1999 | Fossum et al. | |
| 6,015,088 A | 1/2000 | Parker et al. | |
| 6,053,408 A | 4/2000 | Stoner | |
| 6,097,856 A | 8/2000 | Hammond, Jr. | |
| 6,278,481 B1 | 8/2001 | Schmidt | |
| 6,343,740 B1 | 2/2002 | Ju et al. | |
| 6,452,632 B1 | 9/2002 | Umeda et al. | |
| 6,512,218 B1 | 1/2003 | Canini et al. | |
| 7,102,116 B2 | 9/2006 | Canini et al. | |
| 7,282,688 B2 | 10/2007 | Canini et al. | |
| 7,468,499 B2 | 12/2008 | Canini et al. | |
| 7,551,201 B2 * | 6/2009 | Silverbrook | 348/207.2 |
| 8,058,600 B2 | 11/2011 | Canini et al. | |
| 8,083,146 B2 | 12/2011 | Carlson et al. | |
| 8,368,000 B2 | 2/2013 | Canini et al. | |

FOREIGN PATENT DOCUMENTS

| | | |
|---|---|---|
| EP | 0 730 236 A1 | 9/1996 |
| JP | 6-266884 | 9/1994 |
| JP | 6-274670 | 9/1994 |
| JP | 8-153153 | 7/1996 |
| JP | 8-263582 | 10/1996 |
| JP | 8-315063 | 11/1996 |
| JP | 9-34982 | 2/1997 |
| JP | 9-204487 | 8/1997 |
| JP | 10-145512 | 5/1998 |
| JP | 10-508133 | 8/1998 |
| JP | 10-232924 | 9/1998 |
| JP | 10-261044 | 9/1998 |
| WO | 97/08647 | 3/1997 |
| WO | 98/16896 | 4/1998 |
| WO | 98/48371 | 10/1998 |
| WO | 99/64980 | 12/1999 |

OTHER PUBLICATIONS

Extended European Search Report for corresponding European Application No. 06012087.0 dated Sep. 7, 2007.
International Search Report dated Mar. 1, 2006 for European Patent Application No. 05013873.4.
Fossum, E.R.: "CMOS active pixel image sensors" Nuclear Instruments & Methods in Physics Research, Sec. A: 4 Accelerators, Spectrometers, Detectors and Associated Equipment, vol. 395, No. 3, Aug. 21, 1997 pp. 291-297 D XP004088247.
Office Action {Communication pursuant to Article 94(3) EPC dated Jul. 1, 2010 from corresponding EP Application No. 06012087.0.

* cited by examiner

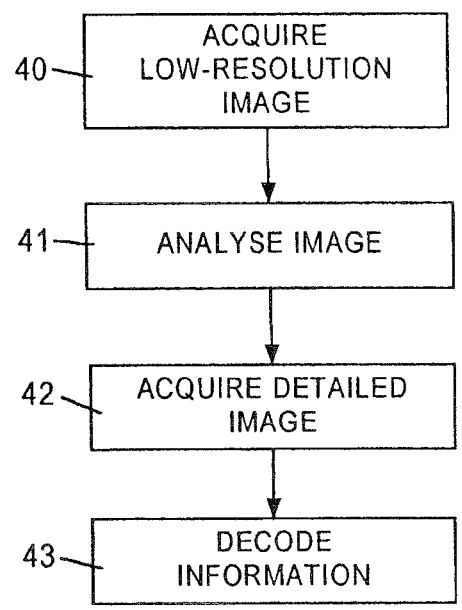
FIG. 11
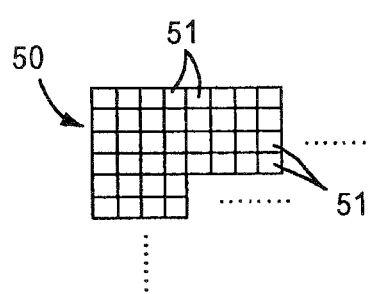    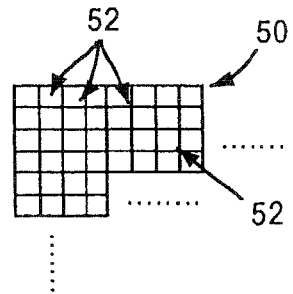
FIG. 12a                FIG. 12b

DEVICE AND METHOD FOR THE ACQUISITION AND AUTOMATIC PROCESSING OF DATA OBTAINED FROM OPTICAL CODES

CROSS-REFERENCE TO RELATED APPLICATIONS

This application is a continuation of U.S. patent application Ser. No. 13/753,912 filed Jan. 30, 2013, which is a continuation of U.S. patent application Ser. No. 13/295,493 filed Nov. 14, 2011, now U.S. Pat. No. 8,368,000, which is a continuation of U.S. patent application Ser. No. 12/341,460 filed Dec. 22, 2008, now U.S. Pat. No. 8,058,600, which is a continuation of U.S. patent application Ser. No. 10/247,681 filed Sep. 20, 2002, now U.S. Pat. No. 7,468,499, which is a continuation of U.S. patent application Ser. No. 09/432,105 filed Nov. 2, 1999, now U.S. Pat. No. 6,512,218, the entirety of each of which is hereby incorporated by reference herein.

FIELD OF THE INVENTION

The present invention relates to a device and a method for the acquisition and automatic processing of data obtained from optical codes.

Hereinafter, the term "optical code" indicates any graphic representation which has the function of storing coded data. A specific example of an optical code comprises linear or two-dimensional codes, wherein data is coded by appropriate combinations of elements with a predetermined shape, i.e. square, rectangles or hexagons, of dark colors (normally black), separated by light elements (spaces, normally white), such as bar codes, stacked codes (including PDF417), Maxicodes, Datamatrix, QR codes, or colour codes etc. More generally, the term "optical code" further comprises other graphic forms with a data-coding function, including uncoded printed characters (letters, numbers etc) and specific shapes (patterns) (such as stamps, logos, signatures etc).

In order to acquire optical data, optical sensors are required, converting the data coding image into electric signals, correlated to the brightness of the image dots, which can be automatically processed and decoded (through electronic processors).

BACKGROUND OF INVENTION

At present, optical sensors are manufactured using CCD (Charge Coupled Device) technology. However, these sensors have disadvantages caused by a not always satisfactory reading performance, complexity, cost and size of the entire reading device.

Furthermore, for the manufacture of optical sensors it has already been proposed to use the CMOS technology, presently employed only in integrated electronic circuits. Hitherto however, CCD technology has been preferred to CMOS technology, since its performance is better as to quantic efficiency, optical "fill factor" (i.e. the fraction of the useful area occupied by the individual detection element or pixel in order to acquire optical data), dark current leakage, reading noise and dynamics.

Recently, active pixel CMOS sensors (with an amplification section inside the pixel) have been developed, which have performance levels competitive with CCD sensors, but far greater functional capabilities. An image acquisition device can be divided into two parts, i.e. a (linear or matrix-type) optical sensor, supplying output electric signals correlated to the received light, and a unit for processing the electric signals. With the CCD technology used hitherto, whenever the processing unit has to collect data from the optical sensor, it must access all the pixels forming the optical sensor in a predetermined sequence. On the other hand, CMOS technology allows the processing unit to access any pixel directly, without having to comply with a specific order, and without the need to access all the existing pixels. In addition, CMOS sensors are fully compatible with logic circuits produced using CMOS technology itself.

SUMMARY OF THE INVENTION

The object of the invention is thus to provide a device and a method for acquiring optical data, exploiting the intrinsic advantages of CMOS technology, compared with CCD technology.

According to the present invention, a device is provided for the acquisition and automatic processing of data from optical codes, characterised, in combination, by:
a CMOS optical sensor;
an analog processing unit connected to said CMOS optical sensor;
an analog/digital conversion unit connected to said analog processing unit; and
a data-processing unit, connected to said analog/digital conversion unit.

The CMOS sensor can be of linear or matrix type; the device is also provided with a display unit and a keyboard and/or a mouse. An interface permits connection to radio, telephone, GSM or satellite systems.

The CMOS sensor and at least one of the analog and digital image processing units, are preferably integrated in a single chip; consequently the device is cheap, fast and less sensitive to noise.

The device initially advantageously acquires low-resolution images; in the low-resolution images, it looks for interest regions; then it acquires high-resolution images in the interest regions and decodes data in the high-resolution images.

According to the invention, a method is also provided for automatically acquiring data obtained from optical codes, comprising the steps of generating an analog electric signal correlated to the brightness of an image through a CMOS optical sensor; processing said analog electric signal in an analog manner; converting said analog electric signal into a digital signal; and processing said digital signal to extract coded optical data.

In addition, the invention relates to a device for automatic acquisition of data obtained from optical codes, characterised, in combination, by:
a CMOS optical sensor;
an analog processing unit connected to said CMOS optical sensor; and
an analog/digital conversion unit connected to said analog processing unit.

BRIEF DESCRIPTION OF THE DRAWINGS

Further characteristics of the invention will become apparent from the description of some preferred embodiments, provided purely by way of non-limiting example and illustrated in the attached drawings, wherein:

FIG. 11 illustrates a flowchart of a method for the acquisition and automatic processing of data according to the invention;

FIGS. 12a and 12b show two portions of a sensor used in the present device;

DETAILED DESCRIPTION OF THE INVENTION

Figure 1:
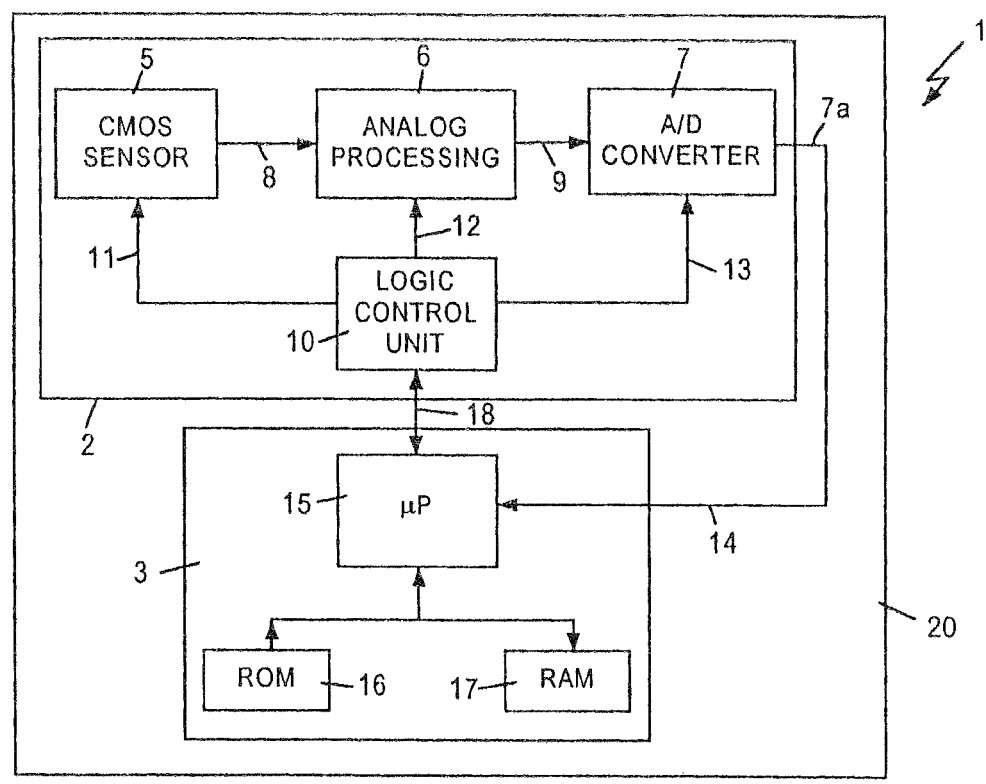
FIG. 1 shows a block diagram of a device for the acquisition and automatic processing of data according to a first embodiment of the invention.

In FIG. 1, a device 1 for acquisition and automatic processing of data comprises an image detector 2 and a processing unit 3. In turn, the image detector 2 comprises, in cascade with one another, a CMOS sensor 5, an analog processing unit 6 and an A/D converter 7.

In detail, the CMOS sensor 5, of known type, comprises a linear or matrix-type array of sensing elements produced using CMOS technology and intended to provide each an image element (pixel). Hereinafter, for the sake of simplicity of description, the term pixel indicates both the image elements taken from each sensing element and the sensing elements themselves. The CMOS sensor 5 then supplies at the output an analog signal correlated to the quantity of light incident on the sensing elements themselves.

The analog processing unit 6, receiving the output signal from CMOS sensor 5 on a line 8, has the function of adapting the output signal from CMOS sensor 5 and allowing subsequent digital conversion of the signal; in particular, it serves the purpose of making the signal compatible with the voltage values required by the A/D converter 7, through automatic gain control; eliminating the (thermal and electro-magnetic) noise generated inside CMOS sensor 5, or picked up from the exterior; and modifying the signal to compensate blurring or excessive image definition.

A/D converter 7, connected to the output of the analog processing unit 6 via a line 9, transforms the analog signal supplied by the analog processing unit 6 into a succession of digital pulses, by sampling the analog signal at suitable moments and coding the data in digital form. In particular, in the simplest case, A/D converter 7 can also use a single bit (and supply only a white/black data), but more generally it is a N bit converter (e.g. 4, 6, 8, 10, 12, 16).

A digital logic control unit 10 is connected to CMOS sensor 5, to analog processing unit band to A/D converter 7, through respective lines 11-13, and supplies them with control signals necessary for their operation, for example activation and synchronism signals. Logic control unit 10 comprises hardware and software components for managing blocks 5-7 and can also carry out very complex tasks.

The output 7a of A/D converter 7 is connected to a microprocessor 15, belonging to the processing unit 3 and connected to an own ROM memory 16 for program storing, and to an own RAM memory 17 for storing data, digital image and program information during execution. Microprocessor 15 is connected to logic control unit 10 via a line 18 and supplies control signals for acquiring the signals associated with all the pixels (frame), or acquiring the signals associated only with some specific pixels, as described hereinafter in greater detail with reference to FIG. 11. Depending on the application, microprocessor 15 can also control pixel acquisition in non-consecutive order. In addition, it processes the digital image data, extracts the coded data from the acquired image and optionally processes this data according to known algorithms.

In the device 1, CMOS sensor 5 and at least one of the elements of the image detector 2 and/or the processing unit 3, are integrated in a single chip. In the example illustrated in FIG. 1, for example, the entire device 1, including the image detector 2 and the processing unit 3, is integrated in a single chip 20.

The device 1 is thus very compact and has lower production costs and a high image processing speed, due to the closeness of the components and lack of external connections.

Figure 2:
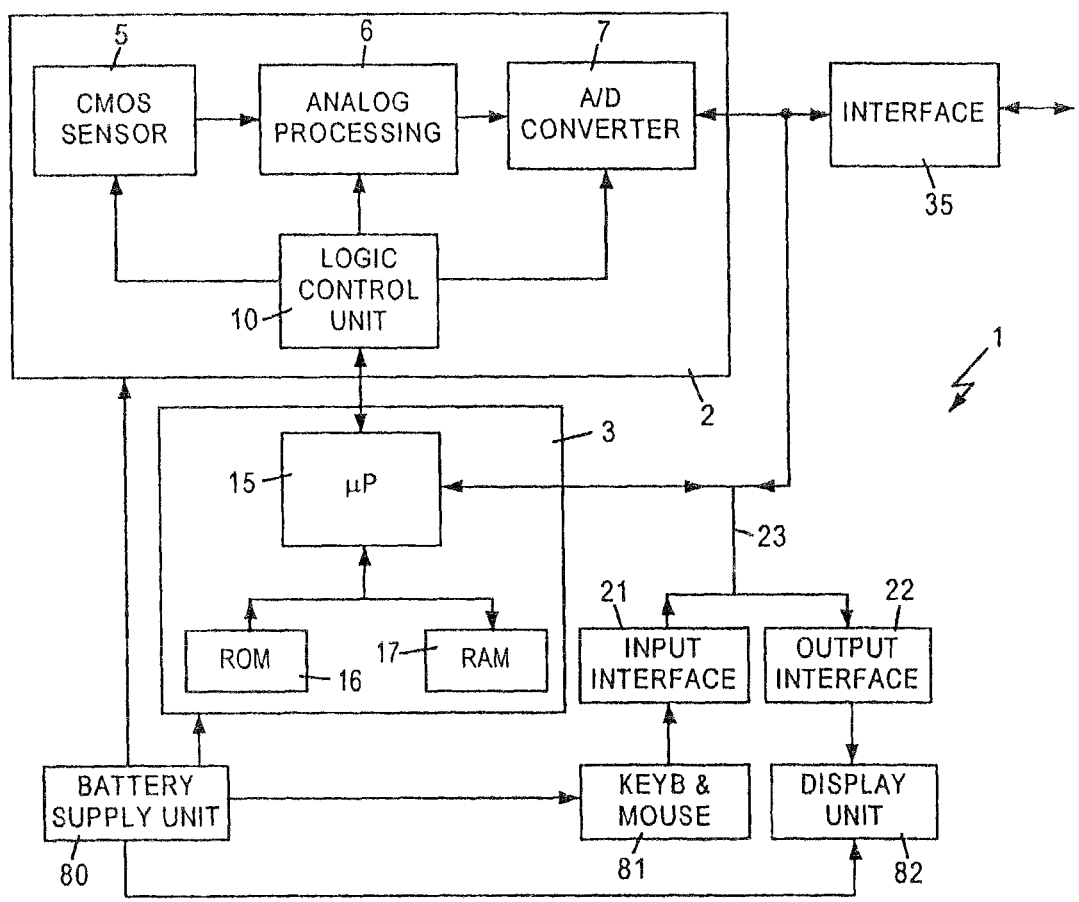
FIG. 2 shows a block diagram of the device according to a second embodiment of the invention.

FIG. 2 shows a device 1 including, in addition to the blocks shown in FIG. 1, a battery supply unit 80, connected to the image detector 2 and to the processing unit 3, for supplying power to device 1, and two user interfaces, specifically an input interface 21 and an output interface 22, also supplied by the battery supply unit 80, in a manner not shown. The input interface 21 is connected to an input device 81, for example a keyboard or a mouse, for inputting data and commands; the output interface 22 is connected to an output device 82, typically a display unit, to display a text and/or images. The input interface 21 and output interface 22 are connected to the microprocessor 15 via a data and control bus 23.

The device 1 of FIG. 2 is also provided with a data transfer and control interface 35, for remote transmission and receipt to/from other devices or to/from a central unit (not shown); typically this interface permits dispatch of data extracted from the image acquired by microprocessor 15.

In this case also, the CMOS sensor 5 can be of the linear or matrix type.

Figure 3:
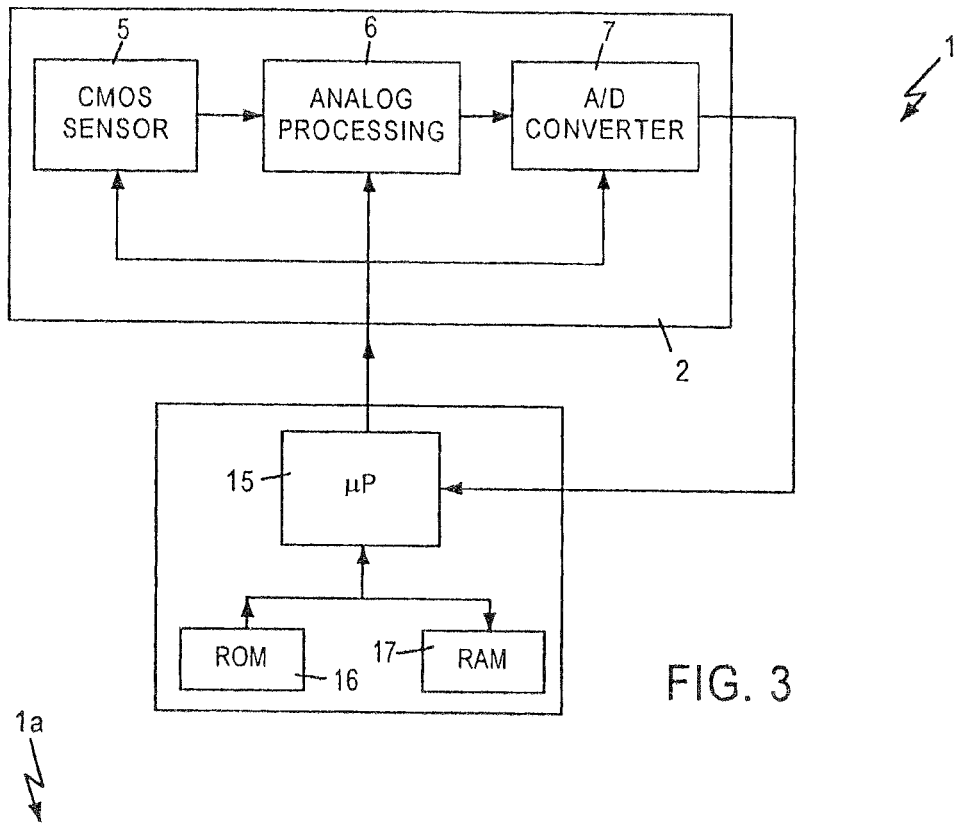
FIG. 3 shows a block diagram of the device according to a third embodiment of the invention.

FIG. 3 shows an embodiment wherein, instead of being concentrated in an appropriate unit (logic control unit 10), the logic control unit is distributed within blocks forming CMOS sensor 5, analog processing unit 6 and A/D converter 7. The logic control unit 10 is thus eliminated and microprocessor 15 is interfaced directly with blocks 5, 6 and 7.

According to a variant, also shown in the block diagram of FIG. 3, the logic control unit is provided inside the microprocessor 15. Therefore, also here, microprocessor 15 is interfaced directly with blocks 5, 6 and 7. This variant is advantageous when it is necessary to produce a large number of devices 1 according to the invention; in fact, in this case, it is possible to produce a custom microprocessor component having hardware resources suitable for direct connection to the image detector 2.

Figure 4:
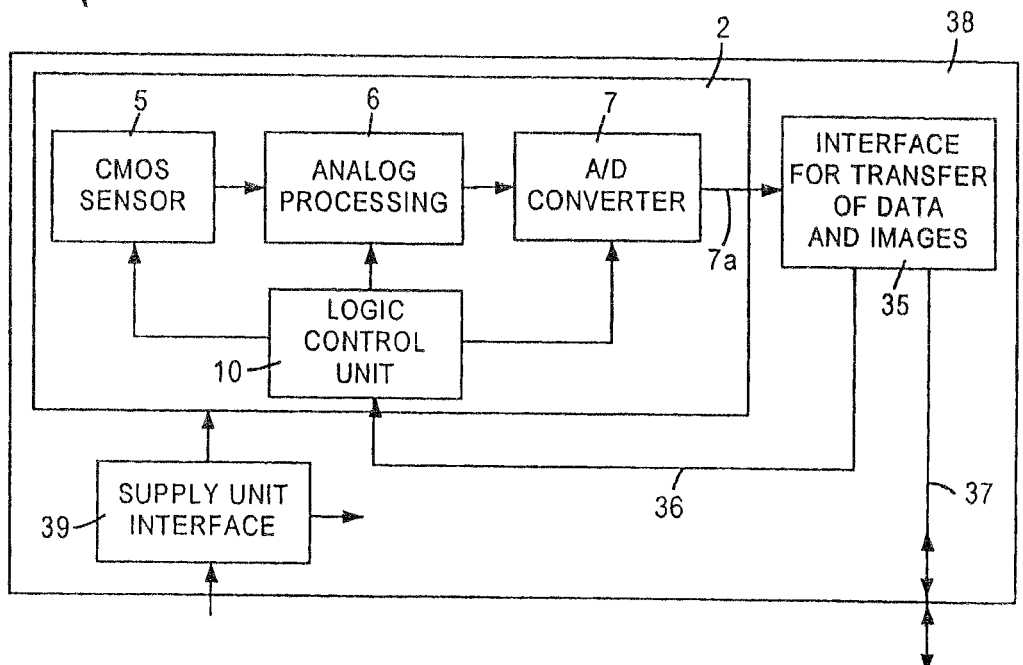
FIG. 4 shows a block diagram of the device according to a fourth embodiment of the invention.

FIG. 4 shows a device 1a formed only by the image detector 2, wherein output 7a of A/D converter 7 is connected to a data transfer and control interface 35. Data transfer and control interface 35 is also connected to the control unit 10 via a line 36 and to a personal computer (not shown) via a line 37.

The data transfer and control interface 35 can for example be a USB, IEEE 1394 or SCSI interface; as an alternative a RAM interface can be provided, which allows the personal computer to collect directly the digital data supplied by the A/D conversion unit 7, or a DMAC interface. In addition, the data transfer and control interface 35 can also be a radio interface, a telephone interface, or a GSM or satellite interface.

Image detector 2 and data transfer and control interface 35 are advantageously integrated in a single chip 38. In the illustrated example, device 1a of FIG. 4 is supplied directly by the personal computer, via a supply interface 39 connected to the personal computer (not shown) and supplying the necessary voltage to all blocks of FIG. 4. As an alternative, device 1a can be supplied via data transfer and control interface 35, or directly via the battery interface and thus be provided with a supply unit block similar to block 80 of FIG. 2 (in a manner not shown).

The device 1a of FIG. 4 can also be provided with input and output interfaces, similarly to interfaces 81 and 82 of FIG. 2.

Data transfer and control interface 35 transfers the images acquired to the personal computer and receives the commands from the latter, so as to allow image processing (for example in the manner described in greater detail hereinafter with reference to FIG. 7) by the personal computer. This solution is advantageous when there is already a personal computer available for further processing (for example statistics, computation etc), which can conveniently also be required to carry out the task of image processing, thus simplifying and reducing dimensions and cost of the device 1a simply to those of image detector 2 and optionally transfer interface 35.

Figure 5:
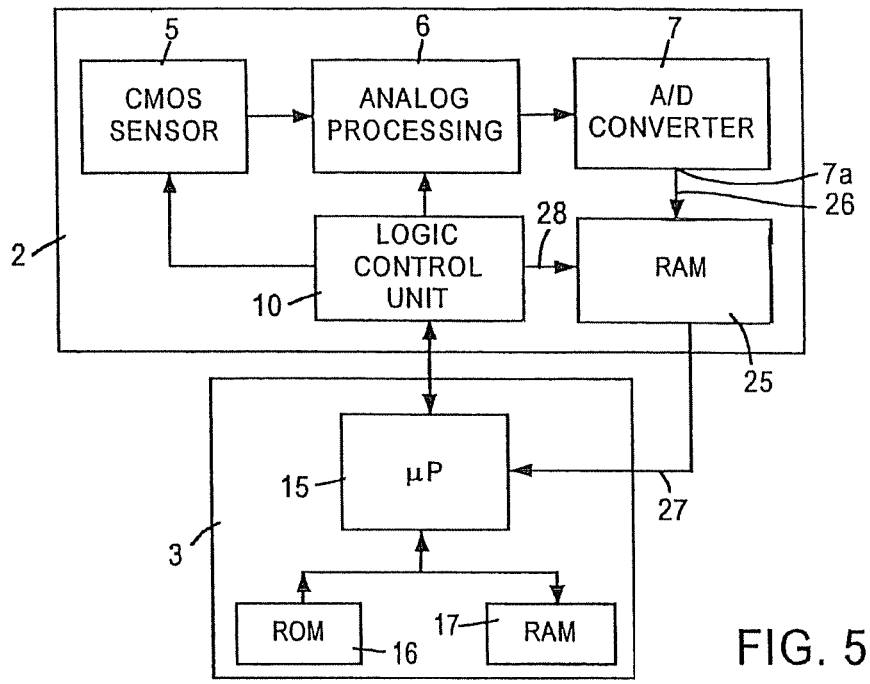
FIG. 5 shows a block diagram of the device according to a fifth embodiment of the invention.

FIG. 5 shows a device 1 which has the same elements as the device of FIG. 1 (and which are therefore indicated with the same reference numbers) and also an additional memory 25 of volatile type (RAM) connected between A/D converter 7 and microprocessor 15. In detail, the additional memory 25 is connected to output 7a of A/D converter 7 via a line 26, to microprocessor 15 via a data and address bus 27 and to logic control unit 10 via a line 28.

The additional memory 25 is part of the image detector 2 and stores the digital image formed by a plurality of dots, the digital value whereof is supplied by A/D converter 7. Thereby, a dedicated component outside image detector 2 is not necessary for image storing.

In the device 1 of FIG. 5, microprocessor 15 can access additional memory 25 directly via data bus 27, when it is necessary to access the image, and it can access its own ROM memory 16 and RAM memory 17, when executing the program or acceding to its own private data other than the image.

In addition, device 1 can be fully integrated (in a manner not shown) in a single-chip with data and control transfer interface 35, or it can be only partially integrated, as previously described.

Figure 6:
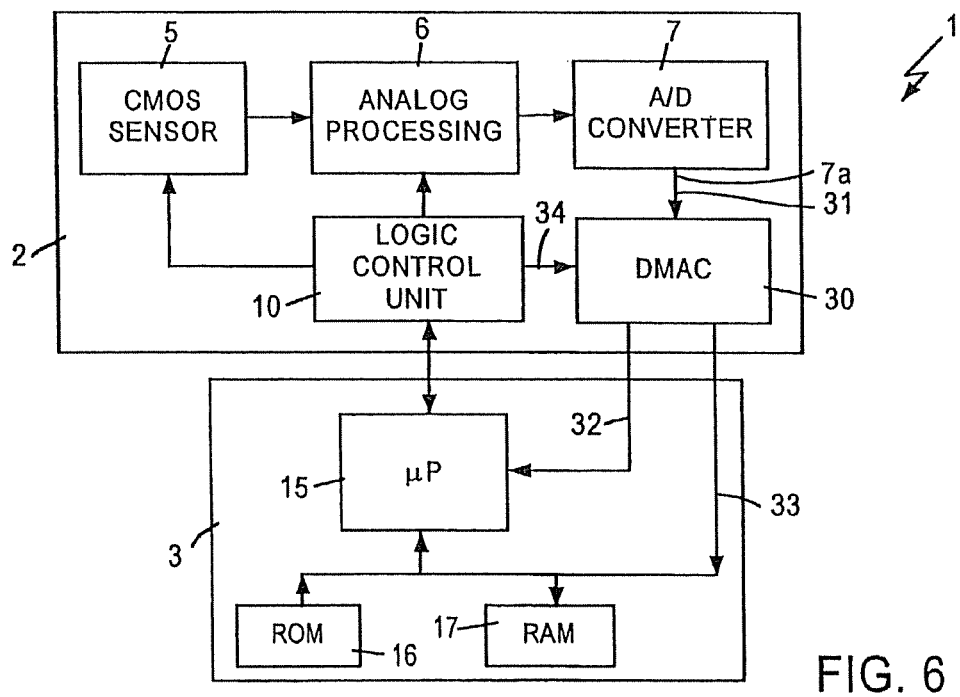
FIG. 6 shows a block diagram of the device according to a sixth embodiment of the invention.

FIG. 6 shows a device 1 having the same elements as the device of FIG. 1 and in addition a DMA (Direct Memory Access) controller 30, connected between A/D converter 7 and microprocessor 15. In detail, DMA controller 30 is connected to output 7a of A/D converter 7 via a line 31, to microprocessor 15 via a control line 32, to the same microprocessor 15, to ROM memory 16 and RAM memory 17 via a data bus 33 and to logic control unit 10 via a line 34.

DMA controller 30 is part of the image detector 2 and has the aim of quickly furnishing available digital image to microprocessor 15, by transferring it directly to RAM memory 17. In particular, when the image must be transferred to RAM memory 17, the DMA controller 30 requests the microprocessor 15 for control of the data bus 33, via the control line 32 and when it obtains this control, it generates the addresses and the control signals necessary to store the output image of A/D converter 7 directly in RAM memory 17. When the transfer has been carried out, control of data bus 33 is returned to the microprocessor 15, which processes the image which has just been loaded.

The device 1 of FIG. 6 can also be integrated fully in a single chip, or in only part of it.

Figure 7:
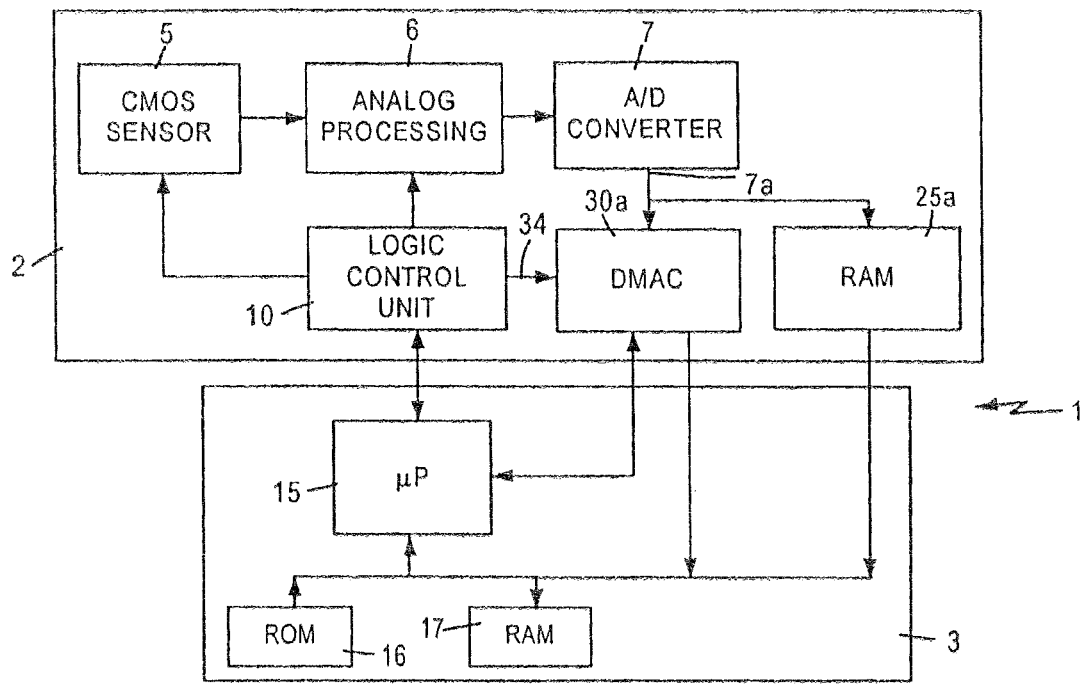
FIG. 7 shows a block diagram of the device according to a seventh embodiment of the invention.

FIG. 7 shows a device 1, having the same elements as the device of FIG. 1 and also an additional RAM memory 25a, similar to that of FIG. 5, and a DMA controller 30a, similar to that of FIG. 6. DMA controller 30a is connected in the same manner as that previously described with reference to FIG. 6 and the additional memory 25a is connected at its output directly to the data bus 33.

The device 1 of FIG. 7 has the advantages of both the architecture of FIG. 5 and the architecture of FIG. 6. In fact, in this case, it is possible to create quickly a copy of the image contained in additional memory 25a into RAM memory 17 and to acquire a second image, thus making it possible to carry out comparisons between two successive images. This is very useful in the case of processing moving images and in general whenever algorithms are used to process images based on the comparison of two successive images.

Figure 8:
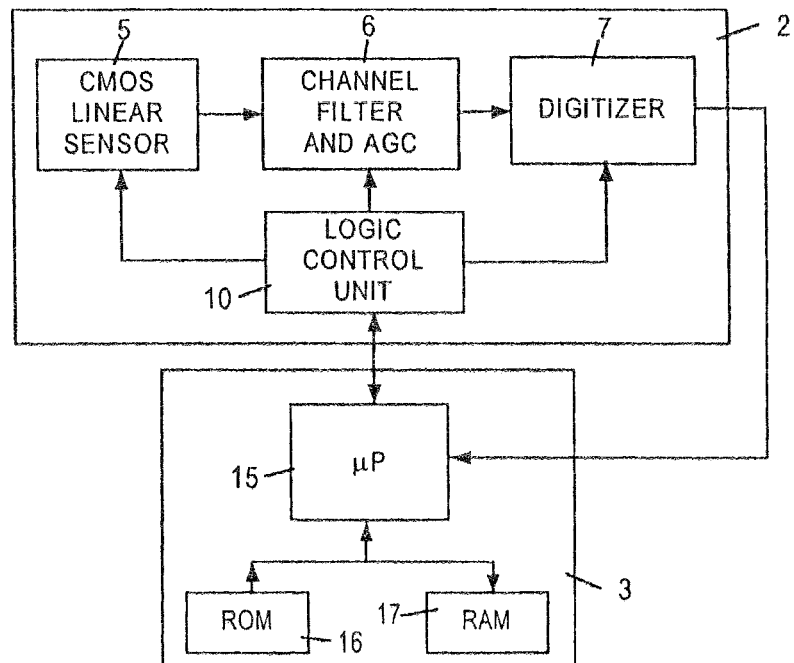
FIG. 8 shows a more detailed block diagram of the device of FIG. 1, according to a first variant.

FIG. 8 shows the more detailed architecture of a device 1, which has the general diagram shown in FIG. 1. In FIG. 8, CMOS sensor 5 is of linear type; analog processing unit 6 comprises a channel filter and an automatic gain control unit; and A/D converter 7 is of the 1-bit type (digitiser). In detail, the analog processing unit 6 has the task of selecting the useful band of the acquired signal, by filtering noise superimposed on the useful signal and automatically controlling the amplitude of the output signal supplied to A/D converter 7, thus adapting the gain to various operative conditions of contrast and intensity of the image acquired. Since A/D converter 7 operates with 1 bit, conversion is particularly simple and quick. Image detector 2 is integrated in a single chip and is connected to the external processing unit 3 formed by a microcontroller, including the microprocessor 15 and the corresponding ROM memory 16 and RAM memory 17.

Figure 9:
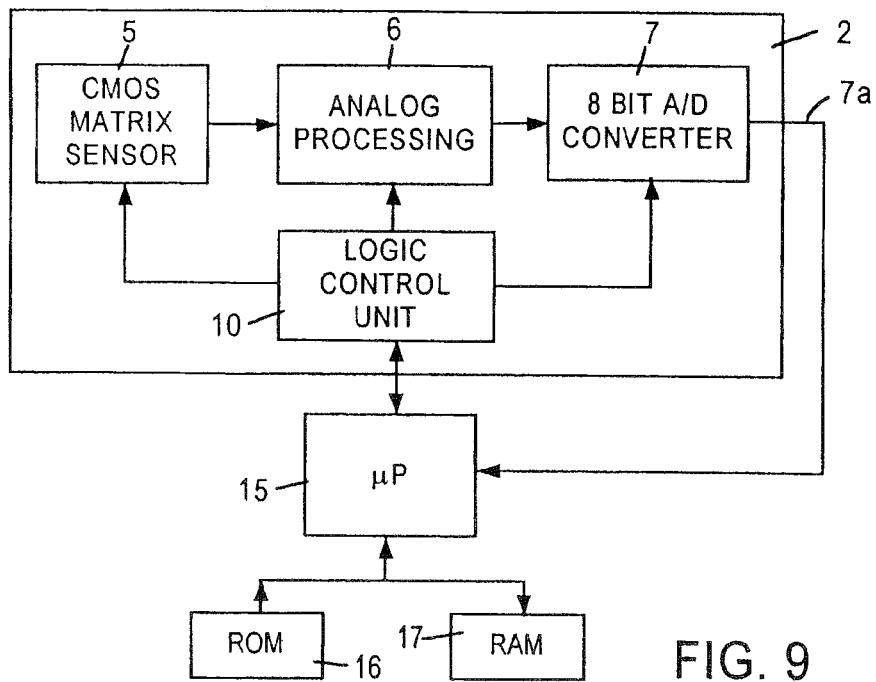
FIG. 9 shows a more detailed block diagram of the device of FIG. 1, according to a second variant.

FIG. 9 shows the more detailed architecture of another device 1, which has the general diagram shown in FIG. 1. In FIG. 9, CMOS sensor 5 is of matrix type; analog processing unit 6 comprises an analog circuit for signal amplification and A/D converter 7 is of 8-bit type, so that it supplies at output 7a a digital signal encoding each pixel according to one of 256 levels of grey. Image detector 2 is integrated in a single chip; microprocessor 15 is external, of RISC or CISC type, and is provided with a non-volatile memory 16 (consisting in this case of an external EPROM) and of a RAM memory 17.

The 8-bit A/D conversion limits the image transfer and processing complexity and speeds up the image processing operations for acquiring data contained in the image.

Figure 10:
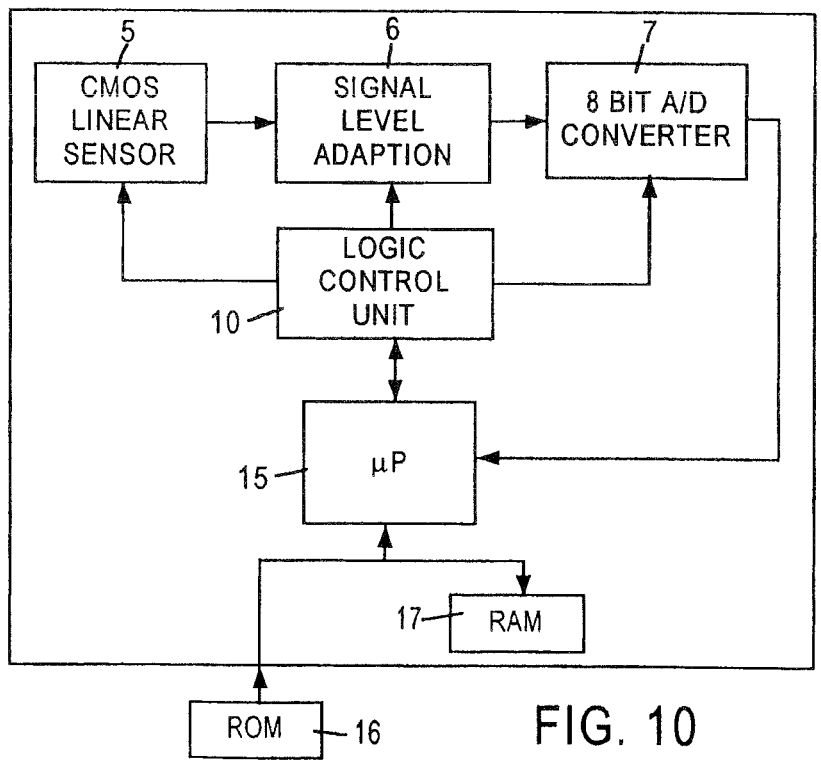
FIG. 10 shows a more detailed block diagram of the device of FIG. 1, according to a third variant.

According to another embodiment shown in FIG. 10, a single chip integrates a CMOS sensor 5 of linear type; an analog processing unit 6; an 8-bit A/D converter 7; a microprocessor 15 and a RAM memory 17 for program data. In this solution, only ROM memory 16 is external.

In the device of FIG. 10, if the brightness level is known a priori (as in the case of contact readers), this is sufficient and thus the level of the signal supplied by CMOS sensor 5 is sufficient, analog processing unit 6 is omitted.

The 8-bit converter ensures that the signal is converted with higher resolution than in the case of FIG. 8. This solution thus makes it possible to simplify as far as possible, or even to eliminate analog processing of the signal and to implement algorithms for processing the images in more complex digital formats. Through these algorithms it is possible in particular to improve the reading performance, in case of codes with very low contrast, damaged codes etc.

To improve the reading speed, the device 1 functions as shown in the flowchart of FIG. 11. In particular, initially the image detector 2 acquires the entire image with low resolution (block 40); then the microprocessor 15 analyses the just detected image, to locate, within the image, interest regions which may contain data to be acquired, block 41; subsequently, the image detector 2, at the command of microprocessor 15, detects the image of only the interest regions with higher resolution than previously, block 42; finally, the microprocessor 15 processes the more detailed images, in order to extract the data they contain, block 43.

Double acquisition of the above-described type can be obtained through a CMOS sensor 5, allowing direct access to the pixels and/or having variable shape pixels, as described hereinafter. In addition, data management is based on the following sequence of steps: detecting optical data (also known as image acquisition) via CMOS sensor 5; identifying interest areas (also known as localization), carried out by the microprocessor 15, program-controlled; and interpreting the data (also known as decoding), also carried out by microprocessor 15 through a software.

In practice, the present device 1 works in every processing step (localization or decoding), with detail levels (image resolution) fitted to the purpose, without making the process excessively onerous. In particular, during localization, lower and rougher resolution is used, to reduce the dimensions of the image to be processed, for determining the position of the data in the image as a whole. Subsequently, only the interest regions, which are supposed to contain data to be interpreted, are acquired by CMOS sensor 5 at a higher resolution; thereby, the decoding algorithms can be applied only to reduced portions of image and the times necessary both for localization and decoding as a whole can be reduced.

In particular, an acquisition method is now described, in which there is direct access to the pixels of the image detector 2, with reference to the flowchart of FIG. 11. It is assumed that a CMOS sensor 5 is used, wherein all pixels are the same and may be accessed directly by selecting lines and columns which need not be adjacent, or by selecting rectangular windows of adjacent pixels, wherein the term "window" means a rectangular portion of the image with maximum resolution.

In this hypothesis, low-resolution acquisition 40 is carried out by a regular subsampling of the image with maximum resolution (thus obtaining for example a first image formed from one line out of every two and one column out of every two, of the image with maximum resolution).

The step of image analysis 41 is carried out by using an algorithm for identifying interest regions on the first image (with reduced dimensions) obtained in step 40. This algorithm can for example search for the regions with greatest contrast and ignore the regions with low contrast, since the conventional optical codes use the alternation of light and dark regions to encode data. Thereby, a list of interest regions is obtained.

The step of high-resolution acquisition 42 then comprises acquiring, for each interest region, only the window containing the interest region, at the maximum resolution. The decoding step 43 then applies the decoding algorithm to each portion of thus obtained image.

A different acquisition method is now described, using variable shape pixels. In particular, it is assumed that a CMOS sensor 5 is used, wherein all pixels are the same and adjacent pixels can be grouped together by hardware so as to be physically connected to one another through controllable switches in order to obtain macropixels with larger dimensions. In this respect, see FIGS. 12a and 12b relative to a portion 50 of a CMOS sensor 5, formed from a plurality of elementary sensors 51, each of which supplies a corresponding pixel; in FIG. 12a, the elementary sensors 51 are distinct, whereas in FIG. 12b the elementary sensors 51 are grouped together such as to provide macropixels 52, formed by 2×2 pixels. The macropixels 52 are then used and managed as single units, associated with a brightness value correlated to the average of the brightness of the elementary pixels. Thereby, images are generated having lower resolution than the maximum, that is when each individual elementary pixel 51 is independently used.

According to the variable-shape pixel method and with reference to FIG. 11, the low-resolution acquisition step 40 comprises a first step, wherein adjacent pixels are grouped together by hardware, on the basis of control signals generated by control unit 10, in turn controlled by the microprocessor 15, and a second step of acquiring a low-resolution image, through the thus obtained macropixels. Then follow: analysis of image 41; high-resolution acquisition 42 (wherein the values of the individual pixels are acquired only in the windows where interest regions have been localized) and decoding 43, similarly to the above-described procedure with reference to the direct-access method.

According to another aspect of the present invention, pixels with a variable height are used. This approach is particularly advantageous to improve the reading capability in case of linear bar codes and stacked codes (i.e obtained by superimposing a series of bar codes with a very low height). Specifically, this method is based either on the possibility of producing macropixels with a rectangular shape and a different number of elementary pixels, or on the possibility of configuring height and active area of the pixel of the CMOS sensors in the manner described hereinafter.

Figure 13A:
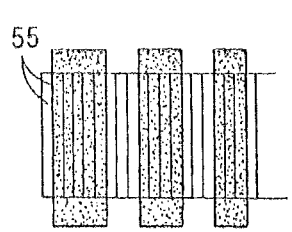
FIGS. 13a, 13b and 13c show optical codes superimposed on a grid representing a first shape of the pixels of the image acquisition system.
Figure 14A:
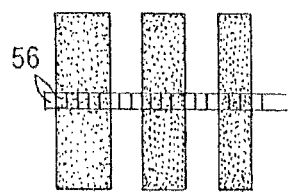
FIGS. 14a, 14b and 14c show optical codes superimposed on a grid representing a second shape of the pixels of the image acquisition system.

Specifically, for reading linear codes (conventional bar codes), use of sensors with rectangular pixels having vertical dimensions much greater than horizontal dimensions (considering as horizontal the direction of the reading line), makes it possible to obtain a relatively broad sensitive detection area with respect to the horizontal dimension; thereby giving greater sensitivity and a better signal to noise ratio, as is immediately apparent by comparing FIGS. 13a and 14a, relative to the reading of a single bar code, respectively with pixels 55 with a high height to width ratio (which in the example illustrated is far greater than 10) and with pixels 56 with a height to width ratio which is close to 1.

Figure 13B:
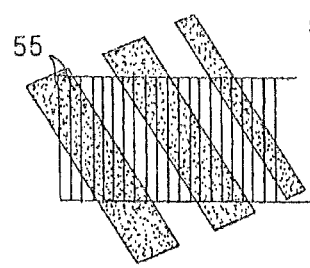
Figure 13C:
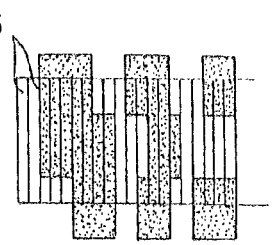
Figure 14B:
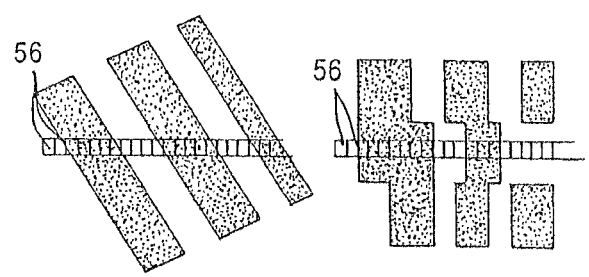
Figure 14C:
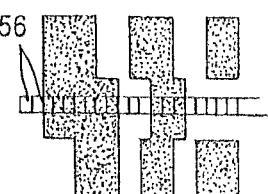

On the other hand, sensors with a reduced pixel height are advantageous in reading optical codes having elements not in line with the pixels (FIGS. 13b and 14b), or in reading stacked codes (FIGS. 13c and 14c).

In particular, the configurability of the pixel shape in CMOS sensors can be obtained by reducing appropriately the sensing area of each pixel. In fact, as is known, each CMOS pixel is formed by a photoelement generating at the output an electric current correlated to the received light quantity and used to charge a storage capacitor. The photoelement has superimposed a gate element, whose biasing makes it possible to isolate a portion of the facing sensing area, thus activating only part of the photoelement sensing area. Therefore, with a sensing area of rectangular shape, such as that shown in FIGS. 13a-13c (for example of 200×14 μm) and by appropriately biasing the gate electrode of each pixel, it is possible to modify the shape of each pixel; for example, it is possible to activate only one end of each sensing area, thus obtaining pixels with a substantially square shape, as shown in FIGS. 14a-14c, or portions with increasing height, until the maximum dimensions of FIGS. 13a-13b.

The above-described possibility of varying the shape of the pixels allows a same detector device to have two (or more) different operative configurations and thus to employ a single data acquisition device for different codes or in a priori unknown reading conditions (for example with unknown inclination of a bar code).

In this case, an algorithm may be implemented, initially attempting reading with maximum height and reducing the height in case of unsuccessful reading. Height reduction can be gradual, if CMOS sensor 5 allows a discrete regulation of the pixel height to obtain a plurality of different heights.

Figure 15:
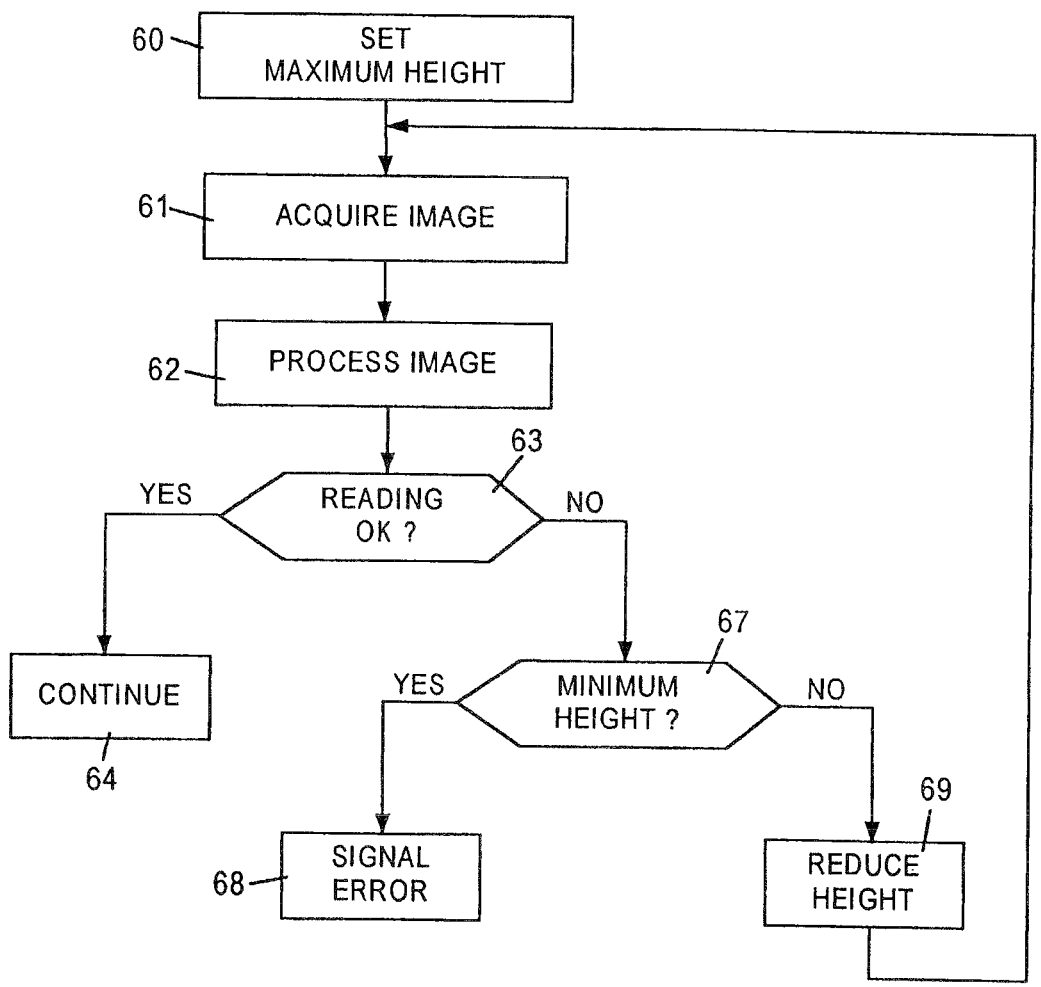
FIG. 15 illustrates a flowchart of a variant of the method for automatic data acquisition according to the invention.

In this case, the data acquisition device with variable shape pixels can operate according to FIG. 15. In detail, the maximum pixel height is initially set (block 60); the image (or at least a reduced, trial portion of it) is then acquired (block 61); the acquired image is processed to extract coded data, for example for localizing interest regions, or is pre-processed to evaluate whether the image is sufficient to extract data, block 62; it is verified whether reading has been successful, block 63; if so, (YES output from block 63), processing is continued (completion of image processing or use of the extracted data, block 64); if not (NO output from block 63), it is verified whether the pixels are already at minimum height (block 67). If so (YES output from block 67), an error signal is generated (block 68, to indicate that reading is impossible); if not (NO output from block 67), the pixel height is reduced, block 69, and the image is acquired another time, returning to block 61.

The advantages of the described device and method are as follows. Firstly, they allow integration in a single chip of both the sensor and at least part of the VLSI logic circuits, thus reducing the costs for the components and packaging of the entire device; in addition, they exploit the inherent advantages of CMOS technology for reading optical coded data; in particular, they allow acquisition of selective image sub-sets, on the basis of the image processing stage, thus simplifying and speeding up data processing.

The present device can be produced according to one of the various above-described architectures, according to the specific application requirements and specific characteristics.

The possibility of integrating significant portions of the device in a single chip permits firstly reduction of the device dimensions (which is particularly advantageous in case of manual optical readers, physically supported by an operator) and secondly, reduction of the processing times and interferences caused by connections, wires etc.

Finally, it is apparent that many modifications and variants can be made to the device and the method described and illustrated here, all of which come within the context of the invention, as defined in the attached claims. In particular, the various blocks described with reference to specific architectures can also be used in different architectures, in accordance with very varied combinations, on the basis of the specific requirements.

What is claimed is:

1. A device for the acquisition of data obtained from reading at least one type of optical code having data coded therein by a combination of elements in accordance with pre-defined rules, comprising:
    an image detector comprising a CMOS optical sensor, the CMOS optical sensor comprising a plurality of CMOS sensing elements, the image detector further comprising an analog to digital conversion unit connected to said CMOS optical sensor; and
    a data-processing unit, connected to said image detector, comprising;
        a microprocessor; and
        a data memory unit connected to said microprocessor;
    wherein the data-processing unit further comprises a program memory unit connected to said microprocessor,
    wherein the device further comprises a volatile memory directly connected to said analog to digital conversion unit and further connected to said microprocessor, and
    wherein the device further comprises a direct memory access controller (DMAC) connected to said analog to digital conversion unit, to said data memory unit and to said volatile memory.

2. The device according to claim 1, wherein said volatile memory is connected to said analog to digital conversion unit by means of a first connection and to said microprocessor by means of a second connection, said second connection being entirely distinct from said first connection.

3. The device according to claim 1, wherein said volatile memory and said DMAC are part of said image detector.

4. The device according to claim 3, wherein said image detector is integrated in a single chip.

5. The device according to claim 4, wherein said microprocessor, DMAC, data memory unit and volatile memory are connected to a common bus.

6. The device according to claim 1, wherein said volatile memory is a RAM.

7. The device according to claim 1, where the DMAC is operable to store image data received from the analog to digital conversion unit directly into the data memory unit.

8. The device according to claim 7, wherein the DMAC is operable to move image data from the volatile memory to the data memory unit.

9. The device according to claim 8, wherein the microprocessor is operable to carry out a comparison of data corresponding to two successive images, with first image data stored in the volatile memory and second image data stored in the data memory unit.

10. The device according to claim 1, wherein the microprocessor is operable to carry out a comparison of data corresponding to two successive images, with first image data stored in the volatile memory and second image data stored in the data memory unit.

11. The device according to claim 1, wherein the DMAC is operable to move image data from the volatile memory to the data memory unit.

12. A device for the acquisition of data obtained from reading at least one type of optical code having data coded therein by a combination of elements in accordance with pre-defined rules, comprising:
    an image detector comprising a CMOS optical sensor, the CMOS optical sensor comprising a plurality of CMOS sensing elements, the image detector further comprising an analog to digital conversion unit connected to said CMOS optical sensor; and
    a data-processing unit, connected to said image detector, comprising;
        a microprocessor;
        a data memory unit connected to said microprocessor; and
        a program memory unit connected to said microprocessor;
    a volatile memory and a direct memory access controller (DMAC) both directly connected to an output of said analog to digital conversion unit,
    wherein the volatile memory is connected to said microprocessor through a common bus, wherein the DMAC is connected to said data memory unit and to said volatile memory through said common bus, wherein the microprocessor is operable to carry out a comparison of data corresponding to two successive images, with first image data stored in the volatile memory and second image data stored in the data memory unit, and wherein said DMAC is configured to take control of said common bus to store said second image data in the data memory unit.

13. The device of claim 12, wherein the DMAC is operable to move image data from the volatile memory to the data memory unit, whereby said second image data is stored in said data memory unit.

14. The device according to claim 12, wherein the DMAC is operable to store image data received from the analog to digital conversion unit directly into the data memory unit, whereby said second image data is stored in said data memory unit.

* * * * *